*Improvement in apparatus for delivering*
December 3d 1869. Grain, Ores, Coal &c.
Boston, Mass. James D. Whelpley } Inventors.
Witnesses Jacob S. Storer
Chas. M. Nickerson PATENTED MAY 10 1870
Fred. W. Longley
102997
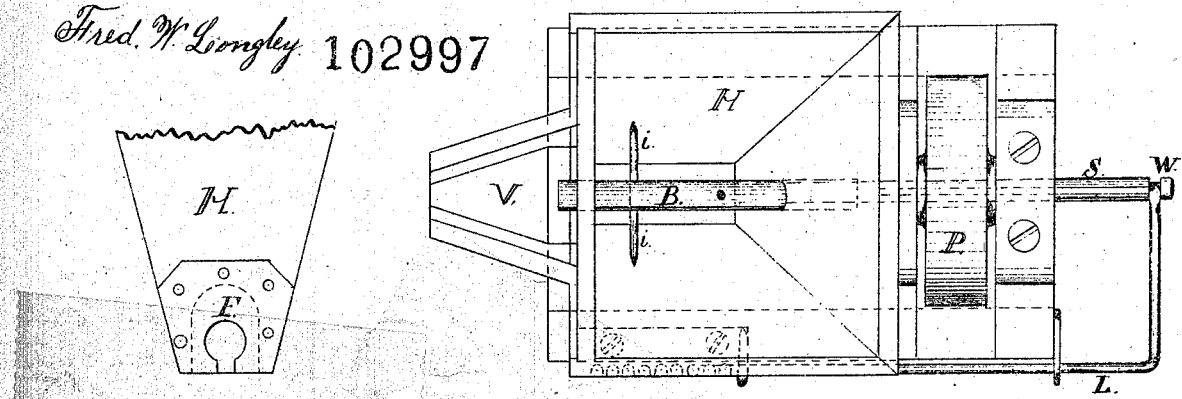
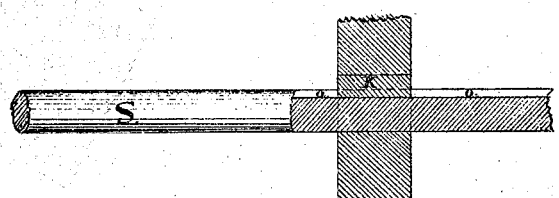
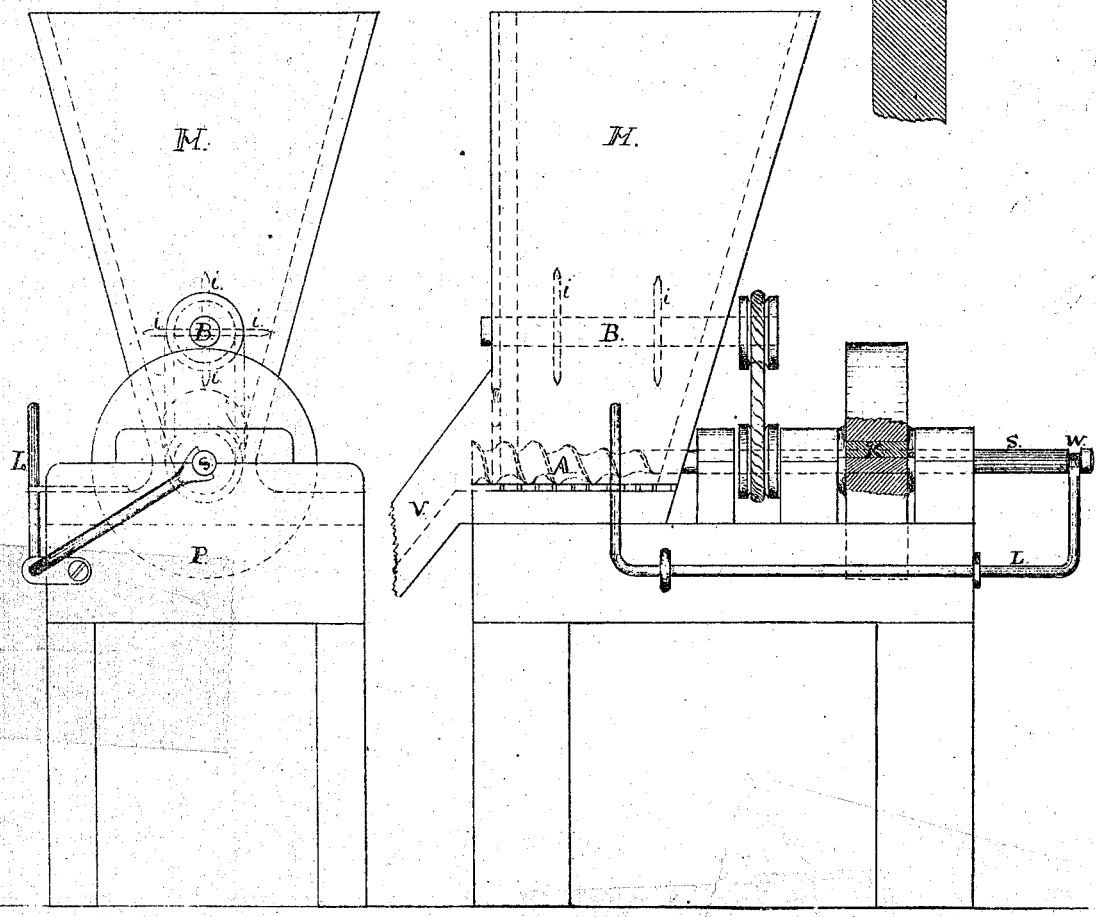

Improvement in apparatus for delivering Grain, Ores, Coal &c.
January 22d 1870.
Boston, Mass.
Witnesses.
Charles M. Nickerson
Fred. W. Longley
James D. Whelpley
Jacob S. Storer
Inventors
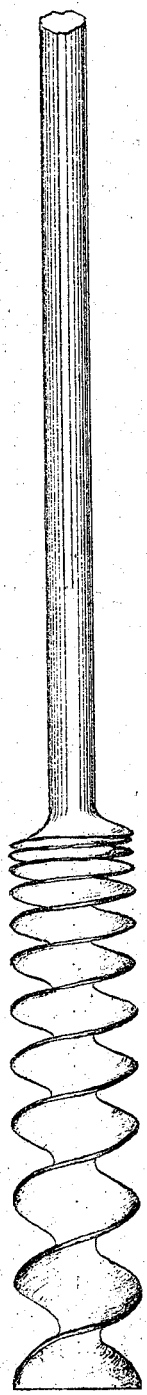

United States Patent Office.

JAMES DAVENPORT WHELPLEY AND JACOB JONES STORER, OF BOSTON, MASSACHUSETTS.

Letters Patent No. 102,997, dated May 10, 1870.

IMPROVEMENT IN FEED APPARATUS FOR GRINDING MILLS, &c.

The Schedule referred to in these Letters Patent and making part of the same.

*To all to whom these presents shall come:*

Be it known that we, JAMES DAVENPORT WHELPLEY and JACOB JONES STORER, both of Boston, in the State of Massachusetts, have invented an Improvement in Apparatus for Delivering Grain, Ores, Coal, &c., into Grinding or Pulverizing Mills, or conveying them from one place to another, which the following specifications and accompanying drawings sufficiently explain.

The nature of our improvement consists in a tapering or conical screw, A, working in connection with a trough and hopper, H, which may be a screw of threads of uniform pitch, tapering from point to shank, like that shown in the drawings.

Also, in combination with this screw, of an arrangement of parts for adjusting its place in the line of its axis, for the purpose of regulating its delivery or feed of material.

Reference to the drawing will show the pulley P, having its bore furnished with a fixed key or spline, K and S, the shank or shaft of the screw furnished with a groove or key-way, O, in which the spline slips longitudinally when the screw is moved in the line of its axis, and L, the lever attached to the end of the shaft or shank by a swivel, W.

The pulley is held in its position by fixed guides upon both sides of it, leaving it free to revolve with the shaft without changing its plane of revolution.

The pulley being moved by band or gear, gives motion to the shaft by means of the spline.

By means of the lever and swivel-joint, the shaft may be shifted longitudinally.

When the screw is put in motion, it may be thrust forward by the action of the lever, so that only the shank shall revolve in the hopper, which is filled with the material to be delivered.

With the screw in this position, there is no delivery from the hopper. The screw may now be drawn by the action of the lever into the hopper, and the quantity of material moved by the screw will be regulated by the extent of the horizontal movement with a constant speed of revolution.

If one inch of the screw be drawn into and revolves in the hopper, the delivery at a certain number of revolutions per minute may be, say twenty pounds per hour, more or less. If two inches be drawn in, and made to revolve in the hopper, the screw, having twice the diameter or pitch, will deliver double that quantity, and so on.

Also, in the perforated rubber flap F, placed over the delivery-hole of the hopper. This hole is larger than the screw, and through it the screw works, and while the flap retains the material in the hopper until it shall have been delivered by the screw, it yields sufficiently to permit easy exit of small pieces of iron, or wood, &c., which might accidentally be mixed with the material in the hopper, and thereby renders impossible any clogging or stopping of the motion of the screw.

Also, in the projecting lip or trough V, extending beyond the hopper, and being an extension of the floor of the same in the form of a trough. The diameter of this trough should be about three times, more or less, the extreme diameter of the screw. Its purpose is to increase the regularity of the feed, and to prevent the too rapid exit of the material, by causing it to pile up on the outside of the rubber flap.

In case the material is to be carried a considerable distance after its delivery from the hopper, the screw may be continued in a long trough, after the usual manner of conveyers; but in a screw used for this purpose, it will be necessary to graduate only that part working in and out of the hopper.

The working part of the screw within the hopper should not, for its best working, be raised more than one-half its largest diameter above the floor of the hopper.

The floor of the hopper may be made of iron, wood, or elastic material. The latter would, in some cases, be preferred, as it would, if touching the screw, enable it to completely empty the hopper, while, from its elasticity, it would also serve, as in the case of the rubber flap, as a protection against accidental obstructions.

Also, in a second shaft, B, parallel with and a few inches above the screw-shaft, laid across and through the hopper, and resting upon bearings on the outside of the hopper, carrying steel pins $i\,i$, as in the drawing, at right angles to itself, from two to six inches in length, more or less, and which is made to revolve by connection with the screw-shaft or some other shaft, the use of this revolving shaft with pins being to stir up the mass of material in the hopper, and thus prevent its clogging or bridging over the screw.

We employ the above-described mechanism for feeding grain, small coal, and ores broken to gravel size, into pulverizing mills, used by us for the pulverization of such material, and other dry and brittle substances.

We regard it as having advantages over all devices hitherto employed for the delivery and conveyance of dry and brittle materials, because it enables us to regulate perfectly the quantity to be conveyed or delivered in a given time.

We claim as our invention and desire to secure by Letters Patent—

1. In combination with the tapering screw, the hopper, and the device for shifting the position of the screw, in the manner and substantially as and for the purposes described.

2. The combination of the tapering screw and hopper, with the device for shifting the screw, consisting of the sliding shaft S, adjustable forked bar L, and the notched plate for holding the handle of the same, when all these parts are constructed, arranged, and operating as herein described and for the purposes set forth.

3. In combination with the tapering screw, and with the hopper, the perforated rubber flap, in the manner and substantially as and for the purposes described.

4. In combination with the tapering adjustable screw, the shaft, furnished with stirring-pins, in the manner and substantially as and for the purposes described.

JAMES D. WHELPLEY.
JACOB J. STORER.

Witnesses:
CHARLES M. NICKERSON,
FRED. W. LONGLEY.